Feb. 10, 1953 S. A. STAEGE 2,627,875
CONDITION RESPONSIVE VALVE CONTROL CIRCUIT
Filed Feb. 12, 1948 3 Sheets-Sheet 1

INVENTOR
Stephen A. Staege
BY Marechal & Biebel
ATTORNEYS

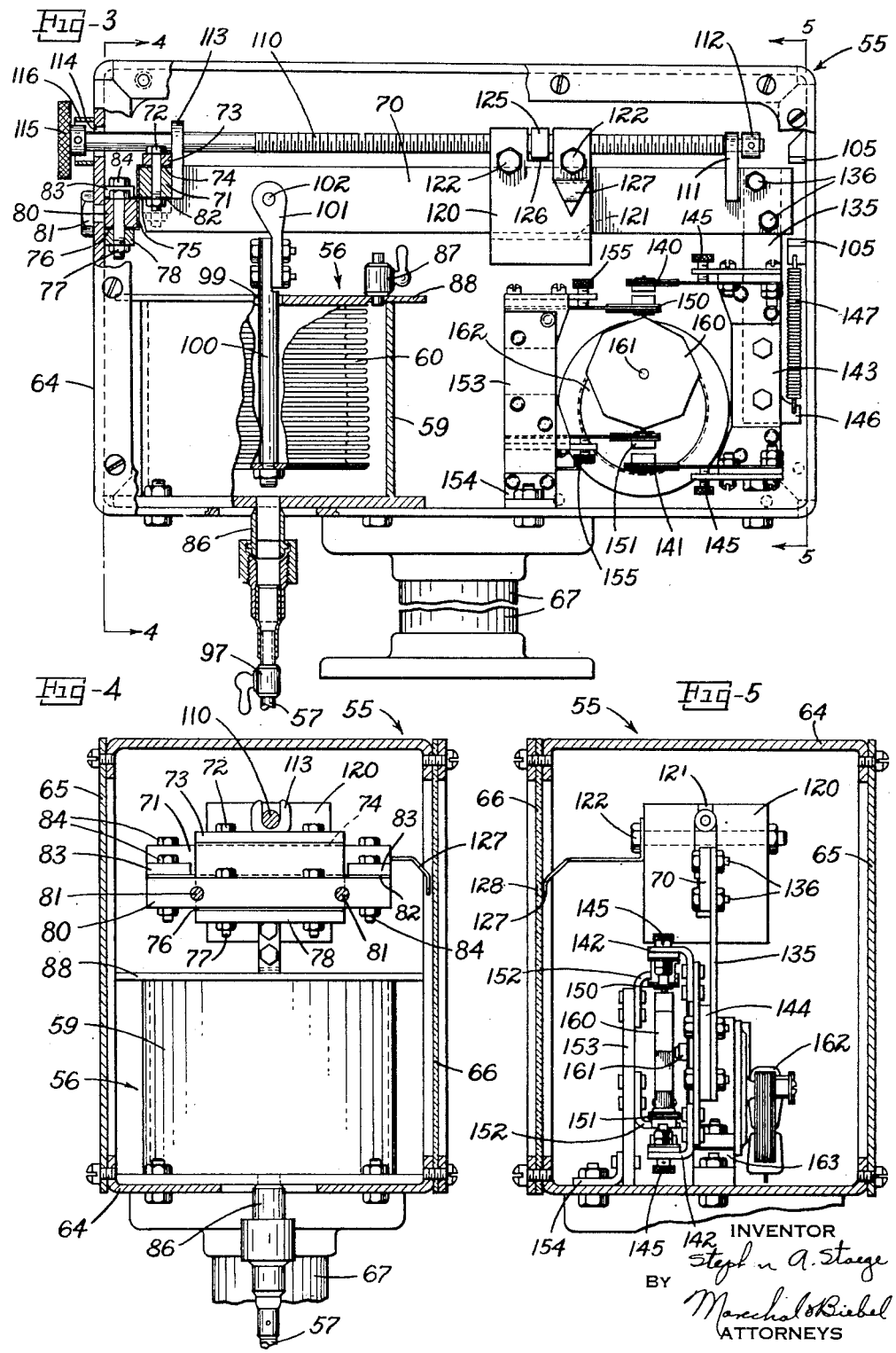
Feb. 10, 1953  S. A. STAEGE  2,627,875
CONDITION RESPONSIVE VALVE CONTROL CIRCUIT
Filed Feb. 12, 1948  3 Sheets-Sheet 2
INVENTOR
Stephen A. Staege
BY
Marechal & Biebel
ATTORNEYS Feb. 10, 1953 S. A. STAEGE 2,627,875
CONDITION RESPONSIVE VALVE CONTROL CIRCUIT
Filed Feb. 12, 1948 3 Sheets-Sheet 3
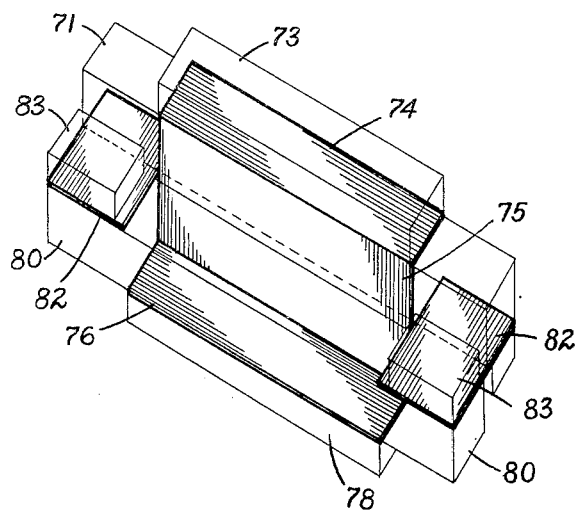
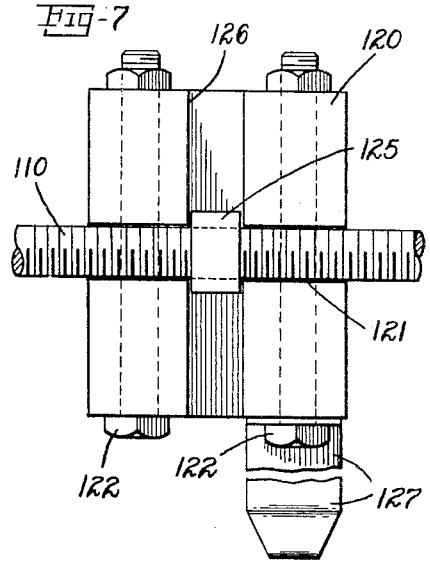
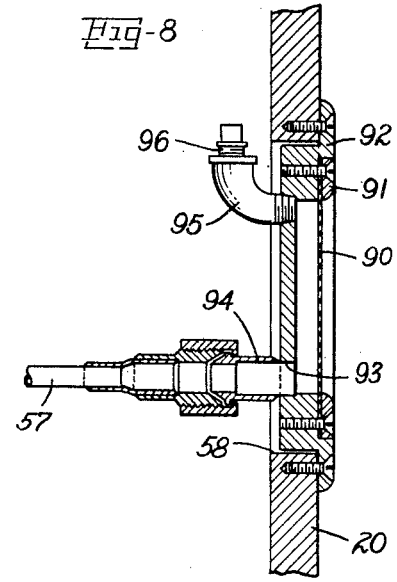
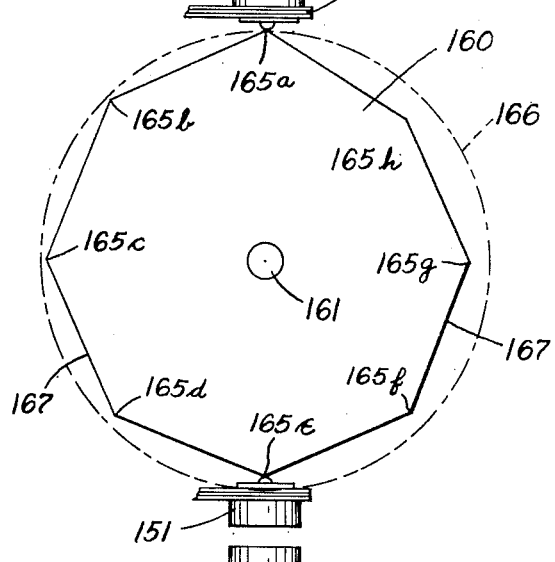
INVENTOR
Stephen A. Staege
BY
Marechal & Biebel
ATTORNEYS Patented Feb. 10, 1953

2,627,875

UNITED STATES PATENT OFFICE 2,627,875

CONDITION RESPONSIVE VALVE CONTROL CIRCUIT

Stephen A. Staege, Hamilton, Ohio, assignor to The Black-Clawson Company, Hamilton, Ohio, a corporation of Ohio Application February 12, 1948, Serial No. 7,761

14 Claims. (Cl. 137—723)

This invention relates to paper manufacture, and more particularly to controls adapted for use in connection with machines or apparatus for the manufacture of paper.

One of the objects of the invention is to provide a control device adapted for use in paper manufacture which is simple and rugged in construction and which will provide precision control over a desired pressure condition such as the liquid level in a machine head box, screen collecting box, cylinder machine vat or like installation.

Another object is to provide a modulating control device of high sensitivity for maintaining a predetermined pressure condition which is effective to cause a correcting action proportional to the change in the condition to be maintained and which will accordingly maintain a desired condition substantially without over-travel.

An additional object is to provide such a control device capable of effecting a correcting action which is not continuous but is intermittent in accordance with a predetermined time cycle and with which the number and the duration of the correcting actions in each cycle are caused to vary in accordance with the magnitude of the change in the liquid level or other condition to be maintained to give an aggregate correcting action substantially proportional to the total change in condition.

It is also an object of the invention to provide such a control device which is effective as a regulator of high sensitivity for normally correcting relatively small errors with substantially micrometer precision and which is also capable of rapidly correcting for large scale variations such as the changes in liquid level or pressure which occur when changing paper speeds or under other conditions which do not require precision control.

A further object is to provide such a control device which possesses a high degree of sensitivity capable of providing for precision control and which is so constructed that the movement of the parts movable in response to changes in the actuating forces is of such short extent and duration as to reduce wear to a minimum and to make possible a rugged construction having a long effective life.

Other objects and advantages of the invention will be apparent from the following description, the accompanying drawings and the appended claims.

In the drawings, in which like characters of reference designate like parts throughout—

Fig. 3 is a view of the control device in side elevation with the front cover removed and with parts broken away and in section to illustrate internal construction;

Figs. 4 and 5 are sectional views on the lines 4—4 and 5—5, respectively, of Fig. 3;

Fig. 6 is a diagrammatic isometric view showing the arrangement of cross springs which provide a pivotal mounting in the control device;

Fig. 7 is a fragmentary stop view illustrating the means for adjusting the device to accommodate different liquid levels or pressures;

Fig. 8 is a fragmentary sectional view showing the membrane diaphragm utilized for screening suspended matter from the control device; and Fig. 9 is a somewhat diagrammatic fragmentary view showing the cam which operates certain of the electric contacts in the control device.

Figure 1:
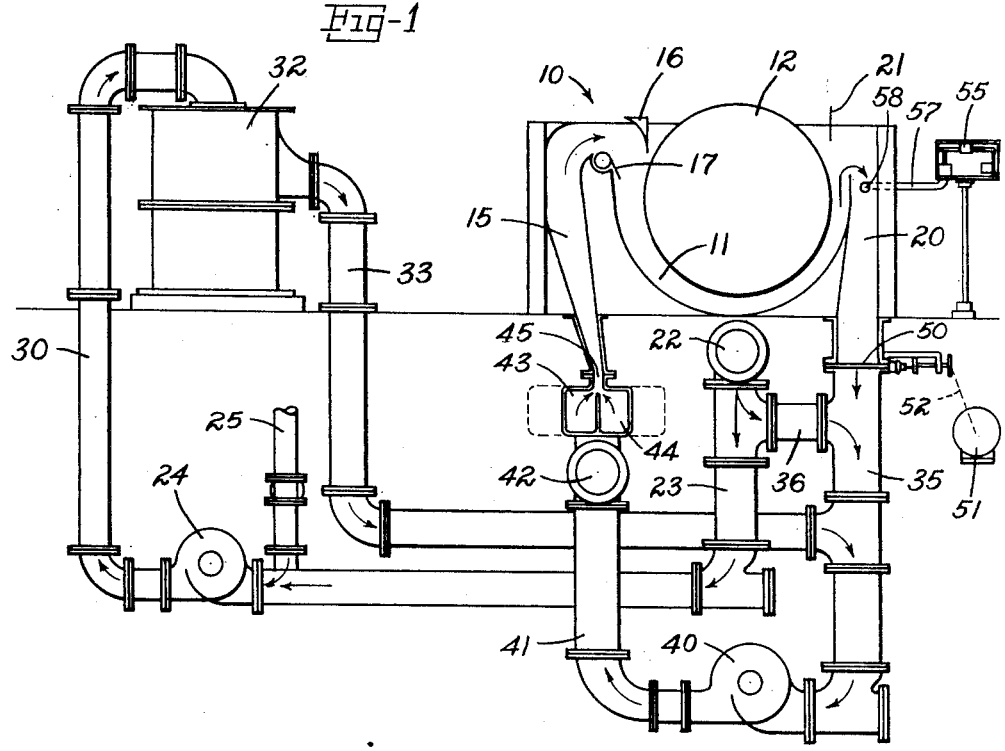
Fig. 1 is a schematic view of the circulating and supply system of a cylinder type paper machine to which the present invention may be applied, showing the path of flow of incoming stock and collected white water as supplied to and discharged from the paper forming parts.

Referring to the drawings, which show a preferred embodiment of the invention, Fig. 1 illustrates somewhat schematically the circulating system for a cylinder type paper machine. The vat 10 is shown as having the vat circle 11 with the rotary forming member or cylinder mold 12 mounted therein. A tapered vat inlet 15 supplies the incoming stock to the vat, the usual mold slice 16 and adjustable rotary slice 17 being provided as desired. The vat has an overflow compartment 20 at its side opposite the inlet 15, and an overflow slice is indicated at 21.

The white water is withdrawn from the vat through pipe 22 and is fed through conduit 23 to the white water pump 24, new stock from the usual regulating box being introduced into conduit 23 from pipe 25 directly ahead of the pump 24. The discharge of the white water pump is supplied through conduit 30 to a suitable screen 32 from which the screened stock passes through conduit 33 to a conduit 35 which also receives the discharge from the overflow compartment 20. A branch conduit 36 provides for the return of a portion of the white water directly into this conduit 35.

A circulating pump 40 delivers the stock from conduit 35 through a conduit 41 which is branched at 42 to supply stock to a pair of tapered counterflow conduits 43 and 44 which are shown as of the construction disclosed in Patent No. 2,347,717 assigned to the same assignee as this application, and which are provided with a common discharge orifice 45 through which the stock is discharged into the tapered inlet passage 15 and thence into the vat.

In order to maintain a predetermined level of liquid within the vat, an adjustable valve 50 is positioned at the lower end of the overflow compartment 20 to control the discharge from compartment 20 to the conduit 35, satisfactory results having been obtained with a plate type gate valve in which there is no bonnet to collect stock or a Saunders type rubber diaphragm valve. Provision is made for reversible power operation of valve 50, a reversible electric motor 51 being shown as operatively connected to cause rotation of valve 50 as indicated diagrammatically at 52, and a control device indicated generally at 55 provides for intermittently operating the motor 51 in accordance with change in the liquid level within compartment 20 to maintain a desired level condition within the vat. To provide for adjusting movement of valve 50 through small increments, the drive from motor 51 should include a large reduction ratio.

Referring to Figs. 2 to 5, the device 55 includes an element 56 capable of developing pressure in accordance with changes in the desired condition to be maintained. A conduit 57 is connected with the interior of compartment 20 at 58 to transmit to element 56 the changes in pressure within the compartment produced by changes in liquid level within the vat 10. Element 56 is shown in Fig. 3 as a cup 59 which contains a pressure responsive bellows 60 and is mounted in the frame or casing 64 of the device. This casing 64 is generally box-like and is provided with a back closure plate 65 and front closure plate 66, the latter being shown as transparent to facilitate observation of the operating parts of the device. The casing 64 may be mounted at any convenient location relative to the paper machine by means such as a pipe or bracket 67, care being taken when the device is used to control liquid level to assure that the device is at such height relative to the vat or other container to be controlled that the pressure responsive bellows 60 will be sufficiently lower than the liquid level within the container to be under some degree of static pressure at all times.

A beam 70 is pivotally mounted within casing 64 by means of cross springs for limited movement in response to changes in pressure within the vat. Referring to Figs. 3 to 6, beam 70 is welded or otherwise secured at one end to a block 71 which is secured by bolts 72 and a plate or strap 73 to one flanged end 74 of a Z-shaped spring 75. The other end 76 of spring 75 is similarly secured by bolts 77 and a plate or strap 78 to a block 80 secured by bolts 81 to the end wall of casing 64. Blocks 71 and 80 are further connected at each end by a pair of flat springs 82, which are secured thereto by plates or washers 83 and bolts 84, and these three cross springs 75 and 82 thus provide a pivotal mounting for beam 70 allowing the beam to move with relatively low friction and relatively minute spring losses and providing high sensitivity in use.

Beam 70 is connected with bellows 60 in such manner as to provide for pivotal movement of the beam in response to changes in the pressure effective on the bellows. Referring to Fig. 3, bellows 60 is shown as a metal bellows having a large number of convolutions and arranged in cup 59 for pressure on the outside thereof, a bellows of this type having been found satisfactory for control of conditions such as liquid level or fluid pressure because it possesses high sensitivity and also because each convolution is subjected to relatively small deflection in use, thus reducing wear on the device and also minimizing its resistance to deflection and the attendant loss in sensitivity. In addition, with this cup type of bellows the center of gravity is at a sufficiently low position to give desired stability under pressure.

The cup 59 is bolted or otherwise secured within casing 64 and is provided with a nipple 86 or like member for connection to conduit 57 as shown. Means such as a petcock 87 is provided at the top 88 of cup 59 to permit escape of air while the cup is being filled with liquid, thus providing for complete absence of air in the bellows system so that any variation in pressure in compartment 20 will be transmitted more quickly to the bellows than would be the case if air or another gas were present in the cup to cushion such pressure changes, and all joints in cup 59 as well as the connections to conduit 57 are preferably soldered or otherwise treated to assure a liquid type seal. This absence of air and the small movement required for bellows 60 provide for relatively negligible volumetric movement of fluid through conduit 57, satisfactory results having been obtained utilizing ¼ inch pipe for this conduit.

When the device is used for maintaining liquid level in connection with a paper machine or in other installations where suspended material is present in the liquid being controlled, means such as a membrane diaphragm may be provided for preventing such suspended material from entering the bellows cup 59. Fig. 8 illustrates such a diaphragm 90 as mounted at the point of connection 58 of conduit 57 to compartment 20. As shown, diaphragm 90 is clamped between a metal ring 91 and a plug 92 which is secured in water tight relation in the hole 58 in the side wall of compartment 20. A hole 93 in plug 92 is provided with a nipple 94 or like member for connection to conduit 57. Plug 92 is also provided with a pipe fitting 95 having a removable closure plug 96 for filling conduit 57, cup 61 and the space between diaphragm 90 and plug 92 with water or other clear liquid.

With this arrangement, fluctuations of pressure within compartment 20 resulting from change in the liquid level therein are readily transmitted through diaphragm 90 without affecting the sensitivity or accuracy of the device. If desired, conduit 57 may be provided with a valve or small restriction to damp rapid fluctuations of large magnitude in the system, as indicated at 97 in Fig. 3.

The upper end of the bellows 60 is soldered or otherwise sealed to the cover 88 of cup 59, and for use of the device for liquid level control the interior of bellows 60 is open to the atmosphere through a hole 99 in cover 88. A rod 100 is secured to the bottom of bellows 60 and passes through hole 99, and its upper end is secured to a clevis 101 which in turn straddles beam 70 and is pivotally connected thereto by a pin 102. Changes in pressure within cup 59 will thus result in expansion or contraction of bellows 60, and such movement of the bellows will be transmitted through rod 100 and clevis 101 to cause upward or downward movement of the free end of beam 70. Stops 105 are provided at the opposite end of casing 64 from the pivotal mounting of the beam to limit this movement of the free end of the beam, satisfactory results having been obtained with these stops arranged to permit a total range of movement of approximately .25 inch for the free end of the beam, thus minimizing the total deflection of the cross springs at the pivoted end of the beam and correspondingly reducing the stresses thereon in use.

Adjustable means are provided for regulating beam 70 to balance different pressures on bellows 60 in order to accommodate the device to the control of different levels of liquid or other conditions to be maintained. A threaded rod or adjusting screw 110 is rotatably supported at one end in an ear or lug 111 mounted on the free end of beam 70, this end of screw 110 being of reduced diameter and being held against axial movement relative to lug 111 by collar 112 as shown in Fig. 3. The other end of screw 110 is supported in a yoke or lug 113 mounted adjacent the pivoted end of beam 70, and it extends through a hole 114 in the casing wall and is provided with a knurled adjusting knob 115, this hole 114 being of sufficiently larger diameter than screw 110 to allow for lateral movement of the screw with beam 70. A short sleeve 116 is welded to the outer side of the casing wall surrounding hole 114 to guard against entry of water into the casing when the machine is being washed up after use.

A weight 120 is mounted for axial movement with respect to beam 70 in response to rotation of screw 110. Referring to Figs. 3, 5 and 7, weight 120 is slotted at 121 to straddle beam 70, and two bolts or pins 122 extend through this slot and ride on the beam to support the weight 120 therefrom. The adjusting screw 110 also traverses slot 121, and it carries a nut 125 which fits within a further slot 126 in weight 120 arranged at right angles to slot 121 and of such dimensions as to hold nut 125 against both rotation and axial movement with respect to weight 120. Accordingly, when screw 110 is rotated, nut 125 will be caused to move axially thereof and of beam 70, thus causing corresponding movement of weight 120 relative to beam 70 to vary the amount of head which bellows 60 will support.

The device can thus be readily adjusted to the control of a desired liquid level control or pressure or other condition to be maintained by appropriate adjustment of screw 110 to a position of weight 120 at which beam 70 is balanced in neutral position between the stops 105 when the desired level condition is obtained. To facilitate this adjustment, a pointer 127 or other indicator may be mounted on weight 120, as by means of one of the pins 122 as shown in Figs. 3 and 5, and a suitable scale may be etched or otherwise provided on the transparent front plate 66 of the casing, as indicated at 128, in cooperating relation with the pointer 127 for readily visible adjustment. The beam 70 thus always occupies substantially the same position when the system is in balance regardless of the pressure for which the device is adjusted, thus contributing to minimizing stress on the bellows in use.

Control means are provided for intermittently actuating the adjusting motor 51 for butterfly valve 50 in accordance with a periodic cycle in response to movement of beam 70 resulting from change in the liquid level or other condition to be maintained, and the control means are also effective to vary the number and duration of operative intervals of motor 51 in each operating cycle of the control means in accordance with the magnitude of the change or error to be corrected for. Referring to Figs. 3 and 5, a bar 135 is bolted or otherwise secured at 136 to the free end of beam 70 and extends downwardly therefrom. This bar carries two vertically spaced circuit-controlling members, shown as spring contacts 140 and 141, which are secured to a pair of yoke arms 142 electrically insulated from each other and from bar 135 by blocks 143 and 144 of suitable insulating material bolted to bar 135, the yokes 142 being riveted or otherwise secured to block 143 as indicated in Figs. 3 and 5. Thumb screws 145 are mounted in yokes 142 and engage contacts 140 and 141 as shown in Fig. 3 to regulate the relative spacing between these contacts. Bar 135 is also shown as provided with an outwardly projecting lug 146 providing a mounting for one end of a small biasing spring 147 (Fig. 6) having its other end secured to the lower of stops 105 and serving to reduce extreme sensitivity of beam 70 in cases where there is considerable turbulence or rapid variation in pressure.

Two additional circuit controlling members, shown as spring contacts 150 and 151, are mounted in the casing 64 in cooperating relation with contacts 140 and 141, respectively, and are movable with relation thereto. Referring to Figs. 3 and 5, the contacts 150 and 151 are secured to yoke arms 152 carried by a block or bar 153 of electrically insulating material which is secured to the base of casing 64 as by means of angle bracket 154. Thumb screws 155 are mounted in yoke arms 152 as shown in Fig. 3 and engage the contacts 150 and 151 to regulate the relative spacing and tension of these contacts.

Figure 2:
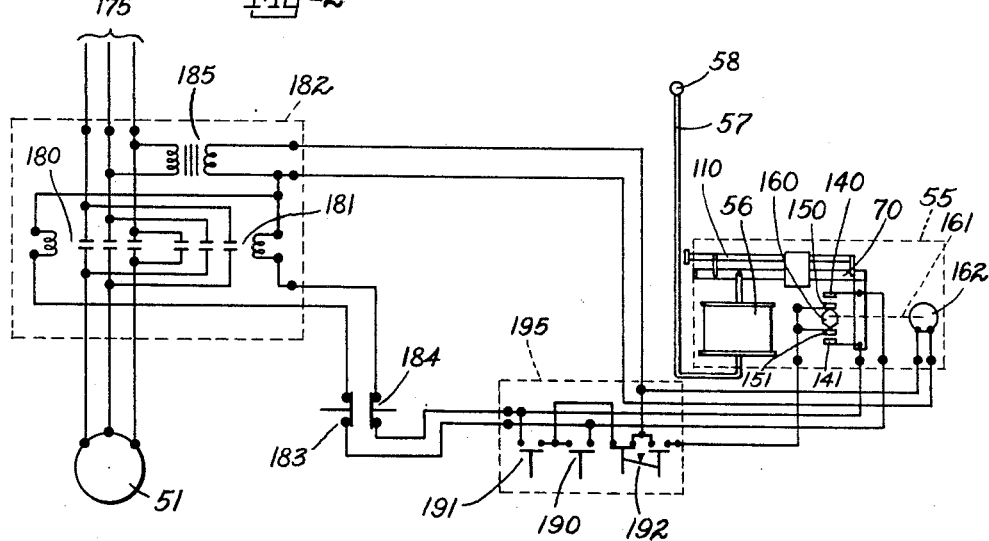
Fig. 2 is a circuit diagram illustrating the operation of controls utilized in accordance with the present invention for establishing and maintaining a predetermined liquid level in the vat of Fig. 1.

The two pairs of contacts 140—150 and 141—151 are connected in circuits controlling motor 51, the contacts in each pair cooperating with each other to open and close one of a pair of selectively operable control circuits to motor 51, as described in detail hereafter in connection with the circuit diagram in Fig. 2. The relative spacing of these contacts is so controlled that when the system is in balance, with the pressure on bellows 60 just sufficient to support beam 70 in its neutral position, neither pair of contacts will be in circuit-closing relation, but when the pressure on the bellows changes, the free end of beam 70 will rise or fall correspondingly, thus carrying one of contacts 140 and 141 into circuit-closing relation with its cooperating contact 150 or 151. In addition, means are provided for continuously moving contacts 150 and 151 towards and away from their respective cooperating contacts 140 and 141 and also for continuously varying the extent of this movement of contacts 150 and 151 to establish periodic operating cycles comprising a plurality of high points of different magnitude alternating with an equal number of low points, thus providing for varying the number of intervals in each cycle during which the active pair of contacts will be in circuit-closing relation and the duration of each interval in accordance with the magnitude of change in the condition to be maintained and hence the extent to which beam 70 and contacts 140 and 141 have been moved.

Referring to Figs. 3, 5 and 9, a polygonal cam 160 is mounted between contacts 150 and 151 for rotation on a shaft 161 continuously driven at a desired speed by a motor 162, such as a small electric clock motor, mounted on the base of the casing 64 by a bracket 163. The cam 160 is shown as octagonal, and each corner or lobe 165 is arranged at a progressively different radial distance from the axis of shaft 161. Thus referring to Fig. 9, the corner or lobe 165a is the highest of the eight high points of the cam, as shown by the dotted circle 166 which is centered on shaft 161 and has a radius equal to the radial distance from the lobe 165a to the axis of shaft 161. Each of the other high points or lobes 165b to 165h, inclusive, is arranged at a progressively lesser distance from the axis of shaft 161 and hence lies within circle 166. Satisfactory results have been obtained with each of these lobes or high points closer by 0.005 inch to the axis of shaft 161 than the adjacent higher high point, and the corner or lobe 165h thus represents the lowest of the plurality of high points of the cam and is 0.035 inch lower than the high point 165a, these dimensions being considerably exaggerated in Fig. 9 for purposes of illustration.

In use, the tension of contacts 150 and 151 is adjusted by means of thumb screws 155 so that both contacts will be in engagement with cam 160 at all times during a complete revolution of the cam. Each of these contacts will thus be caused to oscillate in periodic cycles corresponding to complete revolutions of the cam and each comprising eight alternate high points and low points of different magnitude, the low points being the points on each of the flat sides 167 of the cam which are closest to the axis of shaft 161. The length of each of these periodic cycles is determined by the speed of motor 162, satisfactory results having been obtained with the speed relatively low, for example 4 R. P. M. providing cycles of 15 seconds duration, and with each cam lobe formed with a sharp peak as shown, the electric contact between a pair of contacts 140—150 or 141—151 can be controlled to as short an interval as ¼ second. It is also to be noted that under some conditions of relative dimensions, one or more of the low points of the cam, for example the low point between the highest two high points, may be relatively higher than one or more of the lowest of the high points. In such case, however, the corresponding low point between such lower high points will be relatively still lower, thus maintaining the desired alternation between high and low points of different magnitude in each cycle.

Fig. 2 illustrates control circuits for operating the valve motor 51 in response to rising or falling movement of beam 70 occasioned by changes in the pressure effective on bellows 60. Motor 51 is shown as energized from a three-phase source of power 175, and the motor is controlled through the provision of magnetic reversing switches 180 and 181 in a switch unit identified generally as 182. Suitable upper and lower limit switches 183 and 184 are connected in the circuit of each reversing switch so that the control circuits of the valve motor 51 will be deenergized when the valve 50 reaches either of its limiting positions, thereby avoiding the possibility of damage to the motor or valve.

A control circuit for actuating the reversing switches 180 and 181 is energized from the low voltage secondary of a transformer 185, and push button switches 190 and 191 provide for manual actuation of the respective reversing switches for rapid setting of the valve 50 when the operator wishes to establish a change in the forming conditions. A manually operable reversing switch 192 provides for shifting the device between automatic operation through the contacts 140—150 or 141—151 and manual operation through switch 190 or 191, these switches being readily grouped in a unit identified generally as 195. It will be understood that for manual operation it is necessary merely for the operator to shift switch 192 to the proper position and then to close either of the switches 190 or 191, and that the motor 51 will then continue to operate valve 50 in the selected direction so long as the switch is closed, or until the corresponding limit switch 183 or 184 opens.

In operation with the circuit arrangement shown in Fig. 2, the contacts 140 and 141 are initially adjusted by means of thumb screws 145 to a relative spacing such that when the beam 70 is in approximately its neutral or balanced position, each of these contacts will be out of contact with its associated contact 150 or 151 throughout the complete revolution of cam 160. This adjustment is preferably controlled to leave a desired margin, such as several thousandths of an inch, between each of contacts 140 and 141 and its associated contact 150 or 151 when the contacts in each pair are at their closest relative positions corresponding to the high point 165a on the cam. Accordingly, when the proper liquid level or other desired condition is being maintained, the circuits through both pairs of contacts 140—150 and 141—151 will remain open, thus rendering motor 51 inactive and holding valve 50 in desired position to balance the stock entering and leaving the vat.

As soon as the liquid level in compartment 20 changes, for example if it rises, this will be translated into an increase in the pressure effective on bellows 60, causing the free end of beam 70 to rise and to carry contact 141 in the direction of its oscillating cooperating contact 151, the extent of this movement being substantially proportional to the magnitude of change in the liquid level. When this movement has been sufficient to carry contact 141 within the oscillating range of contact 151 as determined by the initial adjustment of contact 141 by its thumb screw 145, there will be electric contact between contacts 141 and 151, thus momentarily closing the circuit to the magnetic reversing switch 181 and causing momentary operation of motor 51 in a direction to cause valve 50 to open and thus to increase the rate of discharge from compartment 20. The number of intervals of contact between contacts 141 and 151 in each revolution of cam 160, and the duration of each such interval, are determined by the magnitude of change in liquid level in the vat and hence the extent to which contact 141 has been raised, as will now be explained.

Referring particularly to Figs. 3 and 9, if cam 160 rotates in clockwise direction, during each complete revolution of the cam, contact 151 oscillates in a cycle comprising eight high points each .005 inch lower than the preceding high point in the cycle. As soon as contact 141 has moved within range of at least the highest of these high points, corresponding to the corner or lobe 165a on the cam, the two contacts will touch and close the operating circuit to motor 51 at least during the instant when contact 151 is passing the cam lobe 165a. If the change in liquid level has been fairly substantial, contact 141 may also move within range of some of the other high points on the cam, and each time the contacts close the circuit, the motor 51 will operate to cause a correcting action in the system, thus producing a change in the pressure effective on bellows 60 and resultant return movement of beam 70 and contact 141 to neutral position. However, the correcting action will continue only during the fraction of a second when the circuit through contacts 141 and 151 is closed. For relatively slight changes in level, the correction produced by a single operative interval of motor 51 may be sufficient to return contact 141 to its neutral position and thus limit its engagement with contact 151 to a single interval, or possibly to a single interval in one or two cycles, but for relatively larger changes in level, the movement of contact 141 will carry it within range of a plurality of the high points of cam 160, thus increasing the number of operative intervals of motor 51 during each revolution of the cam.

It should also be noted that the contacts 141 and 151 may touch for an instant before and after a high point or lobe of the cam passes contact 151, and for greater errors the contacts may remain in engagement during the interval corresponding to the flat side 167 between one or more adjacent pairs of high points of the cam. Thus the interval of the correcting action in normal operation may vary upwards from as short a time as a fraction of a second depending upon the magnitude of the error or change in the pressure condition being maintained.

The initial engagement between the two contacts at the start of each cycle will take place at the high point represented by the cam lobe 165a, and in addition this engagement will usually be of longer duration than the others in the cycle, since the parts of the flat sides 167 of the cam adjacent corner or lobe 165a are relatively higher than the corresponding portions of the cam sides adjacent the other corners. Thus at the start of each cycle after a change in level has occurred, there may be an appreciable interval of circuit-closing engagement between the contacts, followed by one or more additional intervals of engagement, each of lesser duration and corresponding to the higher of cam lobes 165b to 165h, until the oscillating contact 151 no longer reaches the contact 141 at the lower high points of the cycle. During this relatively longer inoperative interval, the device will have more opportunity to return to its balanced position as the correcting actions take effect throughout the system, so that in the next cycle or revolution of the cam, both the number and duration of operative intervals will be decreased, and this diminishing action will continue until balance is restored in the system and the desired level is again established in the vat.

The cycle of cam 160 should accordingly be of such duration that under conditions of relatively small variation in the pressure effective on bellows 60, adequate time will be provided between corresponding high points in successive cycles to allow the correcting action of the first such high point to take effect in the system before the corresponding high point in the next cycle is reached and thus to prevent over-correction. The proper cycle length for a particular installation will thus depend upon the operating conditions involved, including particularly the interval required for a correcting action to cause a change in the pressure effective on the control device, and satisfactory results have been obtained with a paper machine of the cylinder type illustrated in Fig. 1 with the cam 160 rotating at 4 R. P. M. as stated.

It will accordingly be seen that the correcting action of the device will not be continuous but will be intermittent during each revolution of the cam. Also, since the effect of the first circuit-closing engagement between the contacts in each cycle will be felt in the system during the interval represented by the flat side 167 of the cam between the corners 165a and 165b and will cause the contact 141 to start to move in the opposite direction, the interval of operative engagement between the two contacts at the next high point in the cycle will be shorter than would be the case if contact 141 remained stationary, and so forth until balance is again restored. Thus both the number and the duration of operative intervals of the correcting means in each cycle will vary in accordance with the magnitude of the change in liquid level or other error in the condition to be maintained, to give an aggregate operative interval and an aggregate correcting action which will be in substantially direct proportion to the magnitude of the change or variation from the desired condition as predetermined by the initial adjustment of the device. Furthermore, this precision control will substantially eliminate tendencies toward over-correction and will effectively maintain the liquid level at the desired level with minimum fluctuation.

It will be understood that if the liquid level in the vat decreases, this will cause operation of the control device in similar manner except that the free end of beam 70 will fall and thus cause contacts 140 and 150 to operate motor 51 through magnetic reversing switch 180 in the proper direction to cause valve 50 to close and thus to decrease the rate of discharge from compartment 20. The device will accordingly function to maintain a desired level within close limits and with substantially micrometer precision. For example, with a bellows 60 of approximately four inches in diameter, the device can be adjusted to respond to variations in liquid level of as little as plus or minus 0.10 inch, and even greater sensitivity can be obtained with a bellows of larger diameter. On the other hand, if it is desired to permit greater variation before correcting action takes place, this may be adjusted for by suitable regulation of the relative spacing of contacts 140 and 141 through thumbscrews 145 to provide for a desired range of movement of beam 70 before either pair of contacts can touch.

In addition to this precision control over variations in liquid level during normal operation, this device will also correct for large scale variations such as occur in connection with changes in paper speed or other major adjustments in the system. When such changes occur, the result in the device will be to cause movement of one of contacts 140 or 141 to a position wherein it is in circuit-closing engagement with its associated contact 150 or 151 throughout one or more complete revolutions of cam 160. Then as conditions approach the desired balance, the device will revent to intermittent operation until the proper level is established. Such major adjustments will necessarily require more time than the operating adjustments described, but this is offset against the time needed for the other adjustments such as pump speeds in the system, and as soon as the new condition is established the device will continue to maintain it with desired precision. Similar semi-continuous operation of the device may also occur when adjustments are being made to change the level or other condition to be maintained, by relative adjustment of screw 110 and weight 120 as described.

While the invention has been described in relation to the maintaining or regulation of a predetermined pressure condition, it is evident that the same system is applicable to the control of other conditions by the making of suitable connections to the pressure devoloping and balancing mechanism. For example, the motor 51 in Fig. 2 may be connected to operate a rheostat controlling the speed of pump 24 or to operate a suitably located throttling valve as shown in the above referred to Patent 2,347,717, and the pressure responsive bellows 60 may be connected as shown in said patent to the stock inlet passage of a Fourdrinier machine, to respond to the pressure of the stock in the inlet passage and thus to provide for maintaining constant pressure therein. In each case the operation of the device will be the same, with the pairs of contacts 140—150 and 141—151 cooperating to regulate the pump speed or stock supply in accordance with changes in the pressure effective on the beam 70.

Additionally the device may be arranged as shown in Fig. 2 with the element 56 constructed and arranged to develop pressure on beam 70 in response to changes in a condition such as temperature or humidity. It will therefore be evident that the pressure which is applied to the device may be developed or transmitted in different ways, such as mechanically through fluid means, or the like, with the changes in such condition being used to actuate the control mechanism.

It should also be noted that the device may be readily arranged to act as a precision measuring device for the pressure effective on the floating beam 70. For such use, the motor 51 may be connected to drive the adjusting screw 110 and thus to cause movement of the weight 120 to correct for deflection of beam 70 caused by variation in the pressure effective thereon and to restore the beam to level position. With this arrangement, the correcting action of the device will be effective on the adjusting screw with the same precise accuracy and speed as already described in connection with the use of the device for regulating liquid level, and the pointer 127 will accordingly cooperate with a suitably calibrated scale 128 to give a continuously accurate measurement of the pressure effective on the floating beam.

Reference is made to the application of the same inventor, Serial No. 7,762, filed of even date herewith and assigned to the same assignee.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A control device for maintaining a pressure condition within predetermined limits by intermittent operation of control apparatus for regulating said condition including a control circuit, said device comprising a frame, a beam, means pivotally securing one end of said beam to said frame, means responsive to change in said pressure condition for causing pivotal movement of said beam, a pair of relatively movable cooperating contact members for said control circuit, a polygonal cam, means including a drive carried by said frame for mounting said cam for rotation about a predetermined axis, the corners of said cam being arranged at progressively different radial distances from said axis around the circumference thereof, means mounting one of said contact members in fixed relation to said frame and in engagement with said cam to cause said member to oscillate in periodic cycles each composed of a plurality of high points of progressively different relative heights corresponding with said corners of said cam and alternating with low points, and means securing the other of said contact members to said beam for movement with said beam relative to said oscillating member.

2. A control device for maintaining a pressure condition within predetermined limits by intermittent operation of control apparatus for regulating said condition including a control circuit, said device comprising a frame, a beam, a bar secured to said beam, a second bar secured to said frame, a Z-shaped spring, means securing one end of said spring to one of said bars and the other end of said spring to the other of said bars, a flat spring arranged substantially at right angles to said Z-spring opposite substantially the midpoint thereof, means securing said flat spring to each of said bars, said springs cooperating with said bars to form a pivotal mounting for said beam, means responsive to changes in said pressure condition for causing pivotal movement of said beam, a pair of relatively movable complementary contact members in said control circuit, means securing one of said contact members in fixed relation to said frame, and means securing the other of said contact members to said beam for movement with said beam in response to changes in said pressure condition.

3. In a control device for maintaining a pressure condition within predetermined limits by intermittent operation of control apparatus for regulating said condition, the combination of a control circuit effective when closed to actuate said regulating means and including a pair of relatively movable cooperating contacts, means including a drive and a cam having a plurality of high points of progressively different relative heights alternating with low points for causing controlled relative movement of said contacts in directions to open and close said circuit in accordance with a periodic operating cycle composed of a corresponding plurality of high points of progressively different relative heights alternating with low points, means sensitive to change in said pressure condition, and means associated with said sensitive means and movable in response to change in the pressure effective on said sensitive means to cause further relative movement of said contacts in such direction as to vary the number and duration of the intervals in each said cycle during which said contacts are in circuit-closing relation.

4. In a control device for maintaining a pressure condition within a chamber by intermittent operation of control apparatus for regulating said condition, the combination of pressure sensitive means including a movable member, means providing a pressure connection between said pressure sensitive means and said chamber, means including a control member movable with said movable member for actuating said regulating means in response to changes in pressure within said chamber, and means including a drive and a cam having a plurality of high points of progressively different relative heights alternating with low points for establishing a periodic operating cycle for said actuating means composed of a corresponding plurality of high points of progressively different relative heights alternating with low points and for varying the number of operative intervals of said actuating means in each said cycle in accordance with the extent of movement of said movable member to provide an aggregate operative interval for said regulating means substantially proportional to the magnitude of change in said pressure.

5. A control device for maintaining a pressure condition within predetermined limits by intermittent operation of control apparatus for regulating said condition including a control circuit, said device comprising a frame, a pair of relatively movable complementary contact members in said control circuit, means for mounting one of said contact members in fixed relation to said frame, means including a drive and a cam having a plurality of high points of progressively different relative heights alternating with low points for causing said fixed member to oscillate in a periodic cycle composed of a corresponding plurality of high points of progressively different relative heights alternating with low points, a pressure sensitive member adapted to be connected with said chamber, means for mounting said pressure sensitive member in said frame, means mounted in said frame and operatively connected with said pressure sensitive member for movement in response to changes in the pressure effective on said pressure sensitive member, and means securing the other member of said pair of control members to said movable means for movement therewith with respect to said oscillating member in response to changes in the pressure effective on said pressure sensitive means.

6. A control device for maintaining a pressure condition within predetermined limits by intermittent operation of control apparatus for regulating said condition including a pair of selectively operable control circuits, said device comprising a frame, a pair of relatively movable complementary contact members controlling each said circuit, a polygonal cam, means including a drive carried by said frame for mounting said cam for rotation about a predetermined axis, the corners of said cam being arranged at progressively different radial distances from said axis, means mounting one of said members in each said pair of contact members in fixed relation to said frame and in engagement with said cam to cause said fixed members to oscillate in periodic cycles composed of a plurality of high points of progressively different relative heights corresponding with said corners of said cam and alternating with low points, a pressure sensitive member mounted in said frame and adapted to be placed in pressure connection with said chamber, a member mounted for movement in response to change in the pressure effective on said pressure sensitive member, and means connecting the other members of each said pair of contact members to said movable member for movement therewith with respect to said oscillating contact members in response to changes in the pressure effective on said pressure sensitive member.

7. A control device for maintaining a pressure condition within predetermined limits by intermittent operation of control apparatus for regulating said condition, said device comprising a frame, means for sensing changes in said pressure condition including a part supported on said frame for movement in response to such pressure change, actuating means for said control apparatus including complementary contact members carried by said frame and said movable part respectively for coaction to operate said control apparatus in response to movement of said movable part, and drive means including a cam having a plurality of high points of progressively different relative heights alternating with low points for establishing a periodic operating cycle for said actuating means in order to vary the number and duration of intervals of coaction of said contact members during each said cycle in accordance with the magnitude of changes in said condition and the resulting movement of said movable part to provide an aggregate operative interval for said control apparatus substantially proportional to the magnitude of said changes.

8. A control device for maintaining a pressure condition within predetermined limits by intermittent operation of control apparatus for regulating said condition including a control circuit, said device comprising a frame, means for sensing changes in said pressure condition including a part supported on said frame for movement in response to such change, control means for said control circuit including a pair of relatively movable complementary contact members, means supporting one of said contact members on said frame, means supporting one said contact member for movement with said movable part with respect to said frame, and drive means including a cam having a plurality of high points of progressively different relative heights alternating with low points for causing movement of the other said contact member in periodic cycles each composed of a corresponding plurality of high points of progressively different relative heights alternating with low points in order to effect coaction of said contact members and operation of said control apparatus thereby in response to movement of said movable part and to vary the number and duration of the intervals of coaction of said contact members during each said cycle in direct relation with the magnitude of said changes in said pressure condition.

9. A control device for maintaining a pressure condition within predetermined limits by intermittent operation of control apparatus for regulating said condition including a control circuit effective when closed to cause operation of said regulating apparatus, said device comprising a frame, means for sensing changes in said pressure condition including a part supported on said frame for movement in response to such pressure change, a pair of relatively movable complementary contact members for controlling said circuit, drive means on said frame including a cam having a plurality of high points of progressively different relative heights alternating with low points for continuously moving one of said contact members toward and away from the other said contact member in a periodic operating cycle including a corresponding plurality of spaced high points of different heights alternating with a plurality of lower points, means supporting the other said contact member for movement with said movable part with respect to said one contact member, means for adjusting the position of said movable part to maintain said contact member thereon out of contact with said periodically moving contact member while said pressure condition is maintained within said limits, and means for causing said movable member to carry said contact member thereon towards said periodically moving contact member in response to change in said pressure condition to effect coaction of said contact members and corresponding operation of said control apparatus.

10. A control device for maintaining a pressure condition within predetermined limits by intermittent operation of control apparatus for regulating said condition including a control circuit, said device comprising a frame, a pair of relatively movable complementary contact members controlling said circuit, means on said frame for causing one of said contact members to oscillate in a periodic cycle composed of a plurality of low and high points, said high points in said cycle being of progressively different relative heights, means for sensing changes in said pressure condition including a part supported on said frame for movement in response to such pressure change, said other contact member being carried by said movable part for movement therewith towards and away from said oscillating contact member in response to changes in said pressure condition, and adjustable means for establishing a neutral position of said sensing means and said movable part maintaining said contact members out of contact when said pressure condition is within said predetermined limits.

11. A control device for maintaining a pressure condition within predetermined limits by intermittent operation of control apparatus for regulating said condition including a pair of selectively operable control circuits, said device comprising a frame, a pair of relatively movable complementary contact members controlling each of said circuits, means on said frame for causing one of said contact members of each said pair thereof to oscillate in a periodic cycle composed of a plurality of alternate high and low points, said high points in said cycle being of progressively different relative heights, means for sensing changes in said pressure condition including a part supported on said frame for movement in response to such pressure change, said other contact member of each said pair being carried by said movable part for movement therewith with respect to said oscillating contact members in response to changes in said pressure condition, and adjustable means for establishing a neutral position of said sensing means and said movable part maintaining each said pair of contact members out of contact with each other when said pressure condition is within said predetermined limits.

12. A control device for maintaining a pressure condition within predetermined limits by intermittent operation of control apparatus for regulating said condition including a control circuit, said device comprising a frame, a pair of relatively movable complementary contact members controlling said circuit, a polygonal cam mounted on said frame for rotation about a predetermined axis, a drive for continuously rotating said cam about said axis, the corners of said cam being arranged at progressively different radial distances from said axis, means on said frame supporting one of said contact members in driven engagement with said cam to cause said contact member to oscillate in a periodic cycle composed of a plurality of high points of progressively different relative heights corresponding with said corners of said cam and alternating with low points, means for sensing changes in said pressure condition including a part supported on said frame for movement in response to such pressure change, said other contact member being carried by said movable part for movement therewith towards and away from said oscillating contact member in response to changes in said pressure condition, and adjustable means for establishing a neutral position of said sensing means and said movable part maintaining said contact members out of contact when said pressure condition is within said predetermined limits.

13. A control device for maintaining a pressure condition within predetermined limits by intermittent operation of control apparatus for regulating said condition including a pair of selectively operable control circuits, said device comprising a frame, a pair of relatively movable complementary contact members controlling each of said circuits, a polygonal cam mounted on said frame for movement about a predetermined axis, a drive for continuously rotating said cam about said axis, the corners of said cam being arranged at progressively different radial distances at said axis, means on said frame supporting one of said contact members of each said pair in driving engagement with said cam to cause said members to oscillate in periodic cycles each composed of a plurality of high points of progressively different relative heights corresponding with said corners of said cam and alternating with low points, means for sensing changes in said pressure condition including a part supported on said frame for movement in response to such pressure change, said other contact member of each said pair being carried by said movable part for movement therewith with respect to said oscillating contact members in response to changes in said pressure condition, and adjustable means for establishing a neutral position of said sensing means and said movable part maintaining each said pair of contact members out of contact with each other when said pressure condition is within said predetermined limits.

14. A control device for maintaining a pressure condition within predetermined limits by intermittent operation of control apparatus for regulating said condition including a pair of selectively operable control circuits, said device comprising a frame, a beam, means pivotally mounting said beam in said frame, means for sensing changes in said pressure condition, an operative connection between said sensing means and said beam for causing movement of said beam about said pivotal mounting in response to such pressure changes, a separate pair of relatively movable cooperating contact members in each of said control circuits, means for mounting one of said members in each said pair in fixed relation to said frame, means including a drive and a cam having a plurality of high points of progressively different relative heights alternating with low points for causing each of said fixed contact members to oscillate in a cycle composed of a corresponding plurality of spaced high points of progressively different heights alternating with low points, and means supporting the other contact member of each said pair on said beam for movement therewith with respect to said oscillating contact members.

STEPHEN A. STAEGE.

REFERENCES CITED

The following references are of record in the file of this patent:

UNITED STATES PATENTS

| Number | Name | Date |
|---|---|---|
| 900,511 | Fulton | Oct. 6, 1908 |
| 1,420,348 | Swift | June 20, 1922 |
| 1,516,999 | Evans | Nov. 25, 1924 |
| 1,975,851 | Kimball | Oct. 9, 1934 |
| 2,106,030 | Junkins | Jan. 18, 1938 |
| 2,204,644 | Adams | June 18, 1940 |
| 2,409,136 | Lilja | Oct. 8, 1946 |